(12) United States Patent
Kraft

(10) Patent No.: US 11,022,040 B2
(45) Date of Patent: Jun. 1, 2021

(54) BACKUP SYSTEM FOR SUPPLYING COMPRESSED AIR TO A GAS TURBINE COMPONENT

(71) Applicant: PowerPHASE LLC, Jupiter, FL (US)

(72) Inventor: Robert J. Kraft, Tequesta, FL (US)

(73) Assignee: Powerphase International, LLC, Hobe Sound, FL (US)

( * ) Notice: Subject to any disclaimer, the term of this patent is extended or adjusted under 35 U.S.C. 154(b) by 380 days.

(21) Appl. No.: 15/430,121

(22) Filed: Feb. 10, 2017

(65) Prior Publication Data

US 2017/0234227 A1   Aug. 17, 2017

Related U.S. Application Data

(60) Provisional application No. 62/293,887, filed on Feb. 11, 2016.

(51) Int. Cl.
| | |
|---|---|
| *F02C 7/00* | (2006.01) |
| *F02C 7/18* | (2006.01) |
| *F02C 6/06* | (2006.01) |
| *F01D 13/02* | (2006.01) |

(52) U.S. Cl.
CPC .............. *F02C 7/185* (2013.01); *F01D 13/02* (2013.01); *F02C 6/06* (2013.01); *F05D 2260/232* (2013.01); *F05D 2270/3062* (2013.01)

(58) Field of Classification Search
CPC .. F02C 67/143; F02C 6/08; F02C 7/08; F02C 7/10; F02C 7/185; F02C 6/06; F02C 7/143; F01D 13/02
See application file for complete search history.

(56) References Cited

U.S. PATENT DOCUMENTS

| | | | | |
|---|---|---|---|---|
| 2011/0138818 A1* | 6/2011 | Mizukami | ............... | F01D 11/24 60/778 |
| 2014/0250902 A1* | 9/2014 | Kraft | ......................... | F02C 6/16 60/773 |
| 2014/0366547 A1* | 12/2014 | Kraft | ......................... | F02C 7/10 60/772 |

* cited by examiner

*Primary Examiner* — Katheryn A Malatek
(74) *Attorney, Agent, or Firm* — Avant Law Group, LLC

(57) ABSTRACT

The invention relates generally to gas turbine engines used for electrical power generation. More specifically, embodiments of the present invention provide systems and ways for improving gas turbine engine reliability through an electric motor backup system for cooling features of the turbine section.

13 Claims, 4 Drawing Sheets

FIG. 1 – Prior Art

BACKUP SYSTEM FOR SUPPLYING COMPRESSED AIR TO A GAS TURBINE COMPONENT

CROSS-REFERENCE TO RELATED APPLICATIONS

This application claims priority to U.S. Provisional Patent Application Ser. No. 62/293,887, filed on Feb. 11, 2016, which is hereby incorporated by reference in its entirety.

TECHNICAL FIELD

The invention relates generally to electrical power systems, including generating capacity of a gas turbine, and more specifically to systems and methods for providing an efficient and more reliable way of cooling engine components.

BACKGROUND OF THE INVENTION

Gas turbine engines are commonly used in land-based power plants for generating electricity. A representative simple cycle gas turbine engine 100 is shown in FIG. 1. These land-based power plants take atmospheric air into a compressor 101, increase its pressure through a compression process, mix fuel with the compressed air and ignite the mixture to generate hot combustion gases through one or more combustors 102, which drive a turbine 103 that is coupled to the compressor 101. The mechanical work from the gas turbine engine 100 is used to drive a generator 104 for producing electricity. The exhaust from the gas turbine engine can be vented to the atmosphere or used for producing steam in a combined cycle operation.

Current popular gas turbine engines typically take in ambient air at the engine inlet and raise its operating temperature and pressure from ambient conditions to approximately 700 deg. F. and 200-250 psi. This compressed air is then passed to one or more combustors where fuel is added and the fuel-air mixture is ignited, creating hot combustion gases having temperatures over 2000 deg. F. The hot combustion gases then pass through the turbine. In order to preserve the components in the turbine section that are exposed to these high temperatures, it is often times necessary to actively cool certain parts such as the stationary turbine vanes and rotating turbine blades. Cooling fluid such as air 105 from the compressor 101 is often directed to the turbine 103, as shown in FIG. 1. However, removing air 105 from the compressor 101 reduces the amount of air which goes through the combustion process, thereby adversely affecting gas turbine engine efficiency.

The assignee of the present invention has developed an auxiliary air compression process for use in gas turbine engines, known as TurboPHASE®, and is disclosed in co-pending U.S. patent application Ser. Nos. 14/350,469, 14/351,245, 14/329,340, and 14/329,433, each of which is hereby incorporated by reference. This auxiliary air compression process provides a system and method for improving the overall efficiency of a gas turbine engine through the addition of compressed air generated by a separately fueled air compression process. This air is directed to the combustion and turbine sections of the gas turbine engine. Furthermore, in co-pending U.S. patent application Ser. No. 14/972,403 and 62/201,031, the assignee of the present invention provides a way to utilize an auxiliary air compression system to aid in turbine cooling.

While improvements have been made to the overall engine efficiency and to the turbine cooling, there is still a need to improve the overall reliability of the cooling system.

SUMMARY

The present invention relates to systems and methods for improving the cooling of a turbine section of a gas turbine engine. In an embodiment of the present invention, a system for providing compressed air to a gas turbine engine is provided comprising a compressor, a combustion system, and a turbine fluidly connected, where a portion of the air from the compressor is used to cool components in the turbine, such as turbine blades and vanes. Also provided is an auxiliary air compression system having a fueled engine, an intercooled compressor, and a recuperator. An electric backup compression system is provided that is in fluid communication with the compressor and the turbine and includes an electrically-powered motor coupled to a backup compressor. In operation, compressed air from at least one of the auxiliary compression system and the electric backup compression system is directed into the turbine for cooling components of the turbine.

In an alternate embodiment of the present invention, a method of providing cooling air to a turbine section of a gas turbine engine is provided where the method comprises operating the gas turbine engine to produce a supply of compressed air from a compressor of the gas turbine engine and operating an auxiliary compression system having a fueled engine, an intercooled compressor, and a recuperator to produce a first supply of pressurized air. An electric backup compression system is also operated comprising an electrically-powered motor coupled to a backup compressor to produce a second supply of pressurized air, where the second supply of pressurized air is formed from a portion of the compressed air from the compressor of the gas turbine engine. At least one of the first supply of pressurized air and the second supply of pressurized air is directed into the turbine section for cooling one or more components of the turbine.

In yet another embodiment of the present invention, a method of providing cooling air to a turbine section of a gas turbine engine is provided. The method comprises operating the gas turbine engine compressor, combustor and turbine to produce a supply of compressed air from the engine compressor and directing a portion of the compressed air to an electronic backup compression system, where the electric backup compression system comprises an electrically-powered motor coupled to a backup compressor to produce a supply of pressurized air. The supply of pressurized air is directed into the turbine for cooling one or more components of the turbine.

In yet another embodiment of the present invention, a method of providing cooling air to a turbine section of a gas turbine engine is disclosed. The method comprises operating the gas turbine engine to produce a supply of compressed air from the engine compressor and operating an auxiliary compression system comprising a fueled engine, an intercooled compressor, and a recuperator, to produce a supply of pressurized air. The supply of pressurized air is directed into the turbine for cooling one or more components of the turbine.

In another embodiment of the present invention, a system for providing compressed air to cool gas turbine engine components is provided comprising a compressor, a combustion system, and a turbine fluidly connected, where a portion of the air produced by the compressor is used to cool components in the turbine. The system also includes a plurality of auxiliary compression systems in selective fluid communication with the components in the turbine, each system comprising a fueled engine, an intercooled compressor, and a recuperator and capable of producing compressed air providing a backup supply of cooling air to the components in the turbine.

In yet another embodiment of the present invention, a system is provided for cooling gas turbine engine components. The system comprises an auxiliary compression system comprising a fueled engine, an intercooled compressor, and a recuperator. An electric backup compression system is also provided comprising an electrically-powered motor coupled to a backup compressor. The auxiliary compression system provides a primary source of cooling air to the gas turbine engine components and the electric backup compression system provides a secondary source of cooling air in the event the auxiliary compression system is not available.

One aspect of the present invention relates to a system and method for allowing a gas turbine engine to continue operating at full power when an auxiliary compression system stops operating.

Another aspect of the present invention relates to systems and methods for an all-electric system to be used in place of the separately fueled auxiliary compression system for air injection.

Another aspect of the present invention relates to a method and system for an all-electric way of taking gas turbine compressor discharge air in a mixing process to add heat to the air being delivered from the electric-driven intercooled air compressor.

Other advantages, features and characteristics of the present invention, as well as the methods of operation and the functions of the related elements of the structure and the combination of parts will become more apparent upon consideration of the following detailed description and appended claims with reference to the accompanying drawings, all of which form a part of this specification.

BRIEF DESCRIPTION OF THE SEVERAL VIEWS OF THE DRAWINGS

The present invention is described in detail below with reference to the attached drawing figures, wherein.

DETAILED DESCRIPTION

Figure 1:
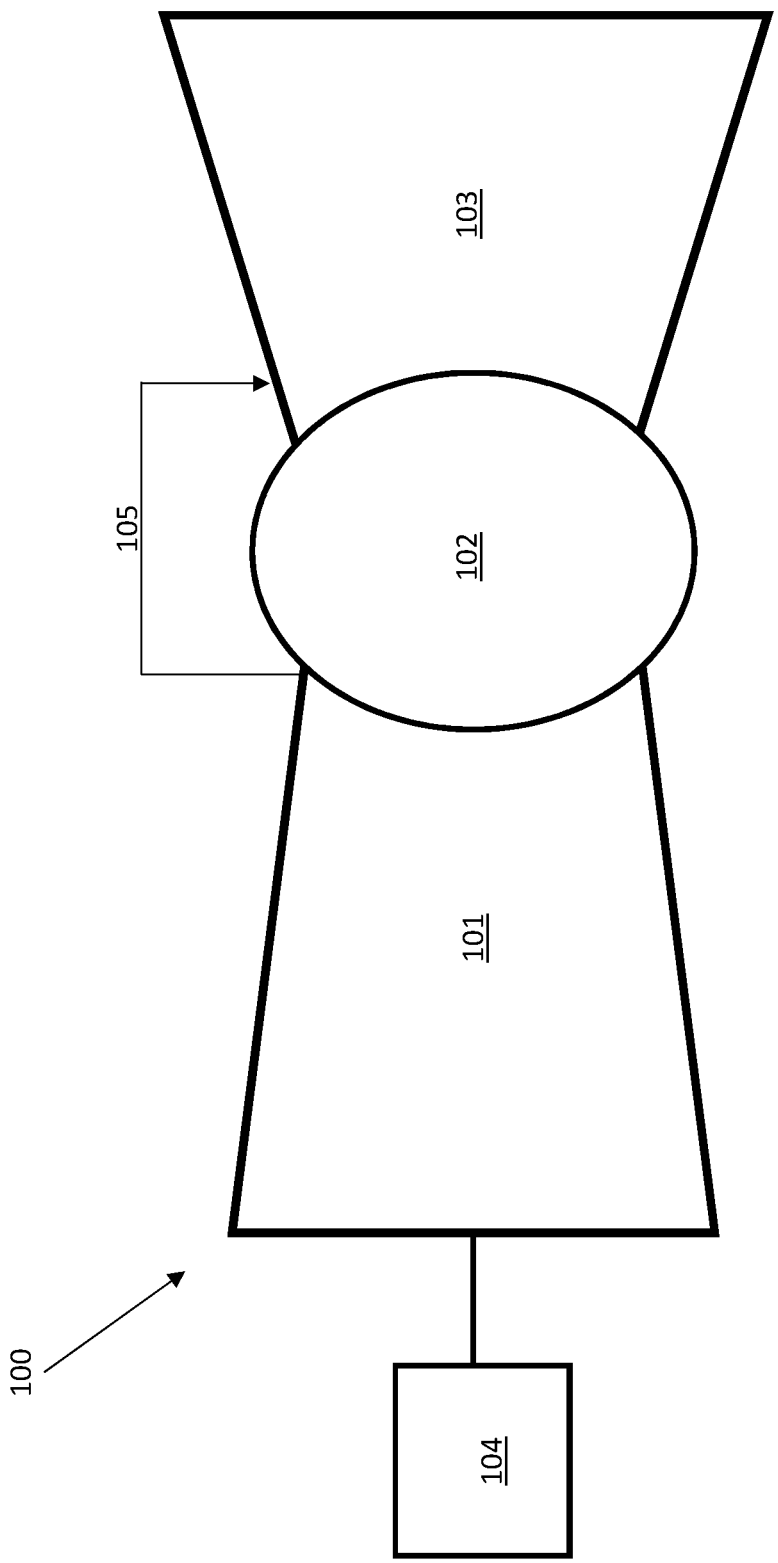
FIG. 1 is a schematic drawing of a gas turbine engine in accordance with the prior art.
Figure 2:
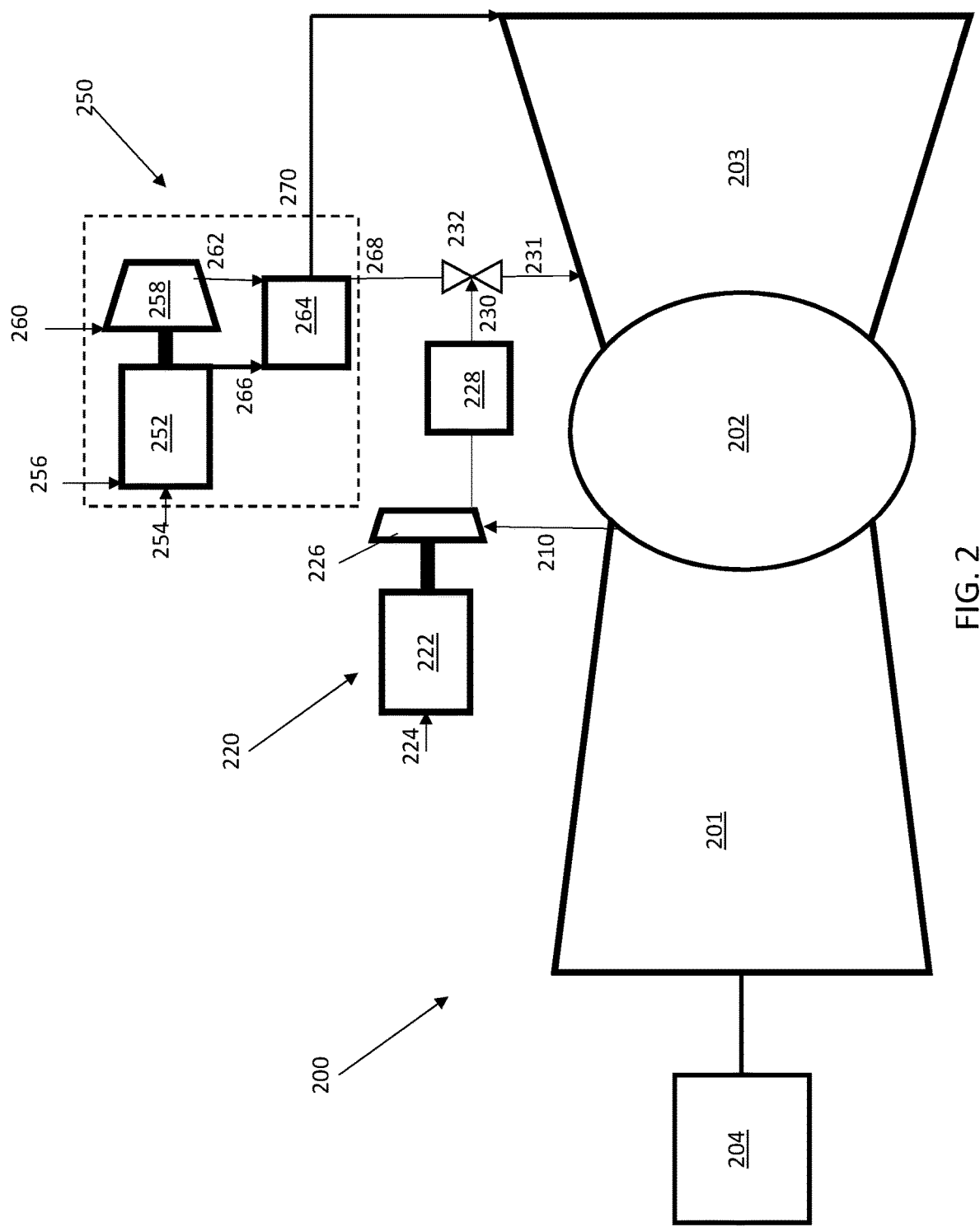
FIG. 2 is a schematic drawing of an auxiliary compression system and an electric backup compression system in accordance with an embodiment of the present invention.

Embodiments of the present invention are described below with respect to FIGS. 2-4. Referring initially to FIG. 2, a gas turbine engine 200 is provided comprising a compressor 201, a combustion system 202, and a turbine 203 in fluid communication. The compressor 201 takes in ambient air and compresses it, through a multi-stage compression process, to a higher temperature and pressure and passes the compressed air to the combustion system 202. A portion of the compressed air 210 is directed from the compressor discharge for purposes of cooling components in the turbine 203.

The compressed air 210 is passed to an electric backup compression system 220 that is also in fluid communication with the turbine 203. The electric backup compression system 220 comprises a motor 222 powered by an electrical supply 224. The motor 222 provides shaft power to turn the backup compressor 226. This electric backup compression system 220 takes compressed air 210 from the engine compressor 201, or an engine compressor discharge at the exit of compressor 201, and further compresses the air to a higher operating pressure. Depending on the temperature and pressure requirements for the cooling air 231 being supplied to the turbine 203, the compressed air may pass through a cooler 228, to cool the air to a lower temperature. However, care must be used when cooling the air temperature of air from the backup compressor in order to ensure the temperature is not lowered to the point of causing cracking in turbine parts due to thermal shock. Compressed air 230, also referred to as a second supply of pressurized air, then passes through a valve 232, which controls flow to the turbine 203.

Figure 3:
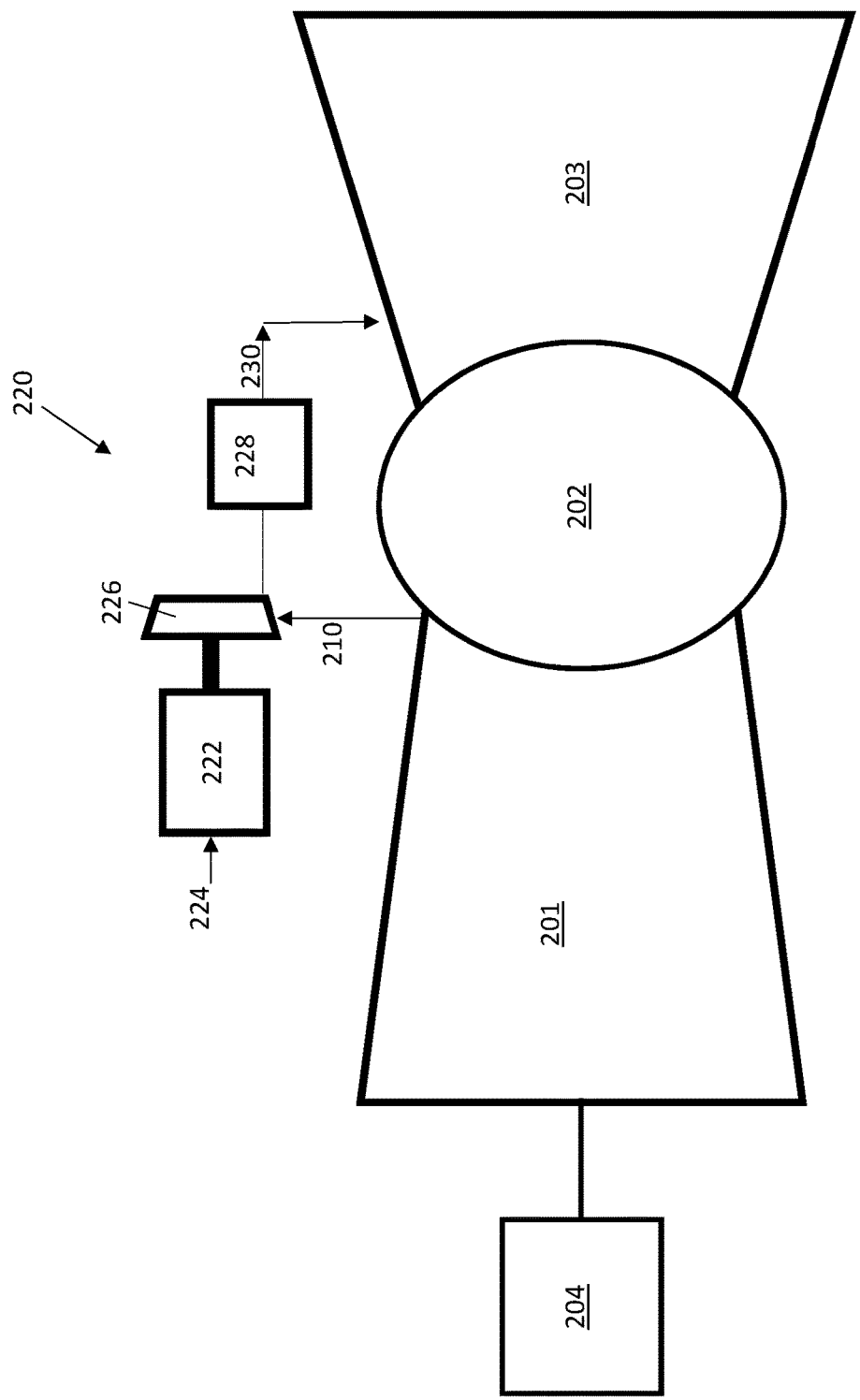
FIG. 3 is a schematic drawing of a gas turbine engine having an electric backup compression system in accordance with an embodiment of the present invention.

The electric backup compression system 220 can be used alone as a way to further compress cooling air, as shown in FIG. 3, or can be used in the event of trouble or availability issues with an auxiliary air compression system 250, as shown in FIG. 2. Referring back to FIG. 2, the electric backup compression system 220 operates in conjunction with or as a separate unit to the auxiliary air compression system 250. The auxiliary air compression system 250 comprises a reciprocating engine 252, which takes in fuel 254 and ambient air 256 and generates power in the form of torque on a shaft, and provides shaft power to turn a multistage intercooled compressor 258. The compressor 258 draws in ambient air 260 and compresses the air to form warm compressed air 262.

The auxiliary air compression system 250 also comprises a recuperator 264, which receives exhaust 266 from the reciprocating engine 252 and the warm compressed air 262 from the compressor 258. As the compressed air 262 passes through the recuperator 264, the compressed air 262 is heated by the exhaust 266 from the reciprocating engine 252. As a result, a supply of hot compressed air 268, also referred herein as a first supply of pressurized air, exits from the recuperator 264. The remaining exhaust 270, which is now cooler due to it being used as a heating source, is routed to the atmosphere or to the gas turbine exhaust.

The electric backup compression system 220 can be sized to continuously supply a portion of the cooling air where the portion of the cooling air represents a fraction of the capacity of the electric driven system. By doing this, the electric backup compression system 220 can operate continuously to minimize any lag time in the event all of, or a portion of, the auxiliary compression system 250 goes offline.

Referring back to FIG. 3, the electric backup compression system 220 is capable of supplying all of the cooling requirements to the turbine 203. Although only a single electric backup compression system 220 is depicted, it may be advantageous to utilize multiple electric backup compression systems in order to provide redundancy to the cooling system.

Referring back to FIG. 2, the valve 232 regulates the flow of compressed air for cooling in the turbine 203. That is, the valve 232 is adjustable and can restrict the compressed air to that of the first supply of pressurized air 268 from the auxiliary air compression system 250 or a second supply of pressurized air 230 from the electric backup compression system 220, or a combination of the first supply of pressurized air 268 and the second supply of pressurized air 230 to form the cooling air 231 for cooling components in the turbine 203, such as turbine vanes or turbine blades.

As one skilled in the art can appreciate, it is beneficial to be able to control the temperature of the hot compressed air 268. This control is accomplished by a compressed air bypass or an exhaust bypass around the recuperator 264, both of which are not depicted for clarity purposes.

Depending on the pressure ratio of the backup compressor 226, it may be advantageous to pull the compressed air for the electric backup compression system 220 from a location other than a compressor discharge plenum, such as an upstream stage in the compressor 201. If air is withdrawn from an earlier stage of the compressor 201, then the cooler 228 may be eliminated from the electric backup compression system 220 because the air entering the system will be cooler than air taken from the compressor discharge plenum. Furthermore, utilizing a backup compressor 226 having more than one stage of compression, such as an intercooled compressor, is another way of reducing the compressor exit temperature by intercooling one or more stages.

One of the main aspects of cooling turbine components through an auxiliary supply system, as disclosed herein, is that the present invention provides cooling air at a pressure higher than the compressor discharge pressure of the engine 200, allowing for more efficient cooling and advanced cooling schemes to be used, resulting in a reduced amount of cooling air required. Using less air for cooling increases the amount of air going through the combustion process, which translates into improved engine efficiency. Furthermore, by lowering the operating temperatures of hot gas path turbine parts, operating life of the turbine parts can be extended.

Figure 4:
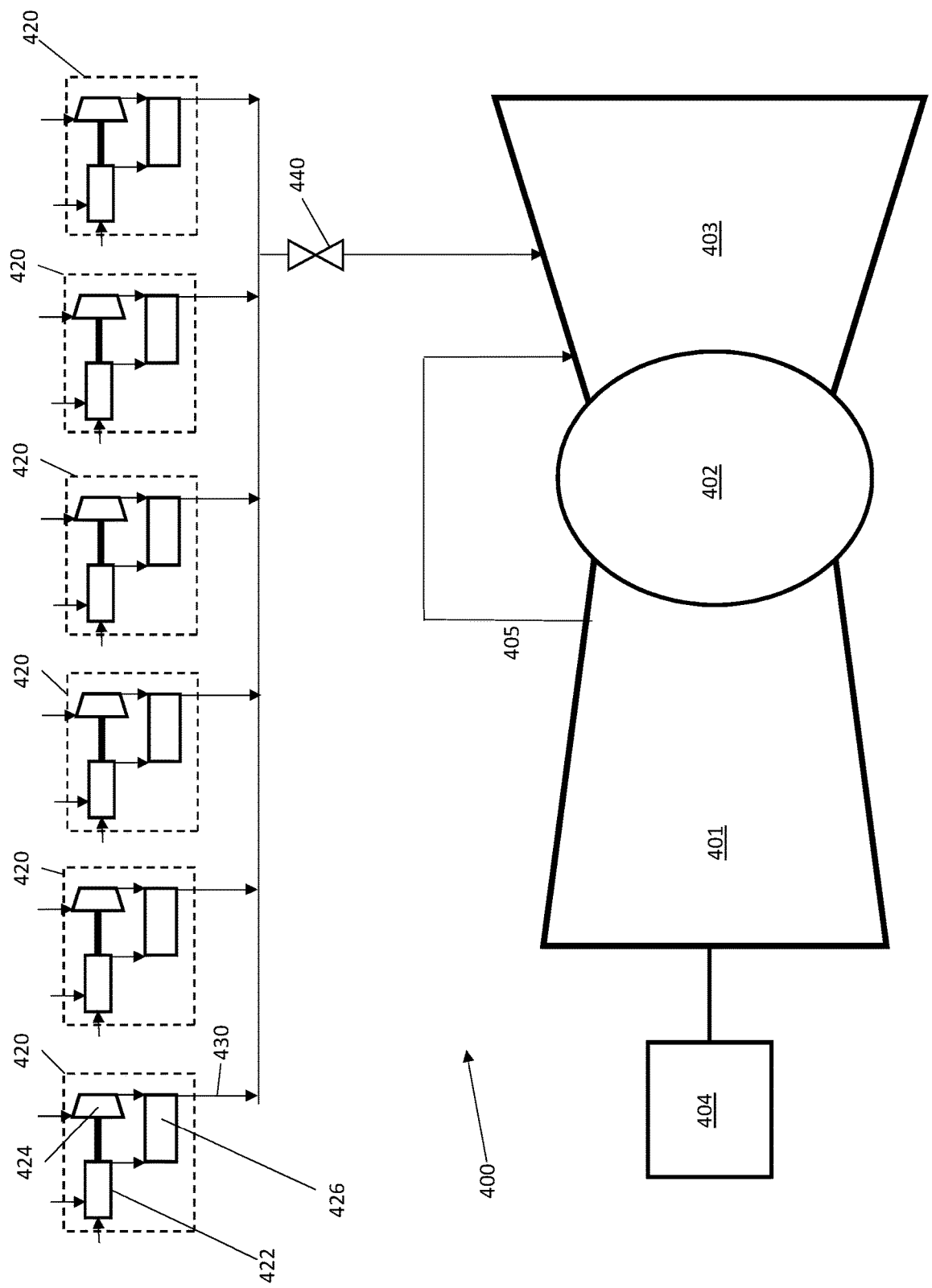
FIG. 4 is a schematic drawing of a series of auxiliary compression systems in accordance with an embodiment of the present invention.

Referring now to FIG. 4, a system 400 for providing compressed air to cool gas turbine engine components is depicted. The system 400 comprises a gas turbine engine having a compressor 401, a combustor 402, and turbine 403 fluidly connected where a portion of the air 405 from the compressor 401 is used to cool components in the turbine 403. Shaft power from the gas turbine engine drives a generator 404. A plurality of auxiliary compression systems 420 are in selective fluid communication with the gas turbine engine at least one of the auxiliary compression system 420 comprises a fueled engine 422, an intercooled compressor 424, and a recuperator 426. The auxiliary compression systems 420 depicted in FIG. 4 are in accordance with the auxiliary air compression system discussed above, and as shown in FIG. 2. While the cooling air 405 for the components of turbine 403 is taken from the compressor 401, the compressed air 430 produced by auxiliary compression systems 420 provides a backup supply of cooling air to the components in turbine 403. The flow of compressed air 430 from the auxiliary compression systems 420 to turbine 403 is regulated by a valve 440.

As used herein, the term "fueled engine" means a heat engine, such as a piston driven or rotary (e.g. Wankel) internal combustion engine (e.g. gasoline engine, diesel engine, natural gas fired engine, or similar fuels, or a combination of such fuels) or a gas turbine, that produces work by combusting a fuel with air to heat a working fluid which then drives blades or the like. The shaft of the engine turns a multi-stage auxiliary compressor which compresses the air, thereby heating the air. Depending on the configuration of the separate compressed air source, the compressor of the backup compression system may be an intercooled compressor, where the air is cooled between each stage of the compressor, thereby allowing for further compression of the air over more typical compression systems. According to one embodiment, the auxiliary compressor is a multistage compressor having at least one upstream compression stage and at least one downstream compression stage fluidly downstream of the upstream compression stage, and the step of operating the fueled engine to drive the auxiliary compressor to produce compressed air from the auxiliary compressor includes the step of cooling the compressed air exiting the upstream compression stage before delivering it to the downstream compression stage. Preferably, the apparatus further comprises an intercooler heat exchanger fluidly connected to at least one of the stage inlets and at least one of the stage outlets to cool the compressed air exiting the at least one of the stage outlets prior to delivering the compressed air to the at least one of the stage inlets downstream thereof.

As those skilled in the art will readily appreciate, each of the embodiments of the present invention may also include flow control valves, backflow prevention valves, and shutoff valves as required to insure that the flow of air, auxiliary compressed air, and compressor discharge air flow only in the directions described herein. While the particular systems, components, methods, and devices described herein and described in detail are fully capable of attaining the above-described objects and advantages of the invention, it is to be understood that these are but embodiments of the invention and are thus representative of the subject matter which is broadly contemplated by the present invention. The scope of the present invention fully encompasses other embodiments which may become obvious to those skilled in the art, and that the scope of the present invention is accordingly to be limited by nothing other than the appended claims. It will be appreciated that modifications and variations of the invention are covered by the above teachings and within the purview of the appended claims without departing from the spirit and intended scope of the invention.

The invention claimed is:

1. A system for providing compressed air to cool gas turbine engine components comprising:
 a primary compressor, a combustion system, and a turbine fluidly connected to each other;
 an auxiliary air compression system for generating a first supply of cooling air and comprising a fueled engine, an intercooled compressor, and a recuperator;
 an electric backup compression system for generating a second supply of cooling air, the electric backup compression system in fluid communication with the primary compressor and the turbine and comprising an electrically-powered motor coupled to a backup compressor; and
 a pathway coupled to an output of each of the auxiliary air compression system and the electric backup compression system; the pathway having a valve configured to selectively direct each of the first supply of cooling air and the second supply of cooling air to the turbine;
 wherein the valve is downstream the recuperator;
 wherein each of the first supply of cooling air and the second supply of cooling air bypasses the combustion system.

2. The system of claim 1, wherein the electric backup compression system is fluidly coupled to an exit of the primary compressor.

3. The system of claim 2 further comprising a cooler for cooling the second supply of cooling air.

4. The system of claim 3, wherein the second supply of cooling air passes through the cooler prior to entering the turbine.

5. The system of claim 1, wherein the second supply of cooling air is provided at a higher pressure than compressed air in the primary compressor.

6. The system of claim 1, wherein the electric backup compression system provides the second supply of cooling air in the event the first supply of cooling air is not available.

7. The system of claim 1, wherein the intercooled compressor and the fueled engine each draw in ambient air.

8. The system of claim 1, wherein the primary compressor is configured to generate a third supply of cooling air, wherein the third supply of cooling air is provided to the electric backup compression system for the generation of the second supply of cooling air.

9. The system of claim 8, wherein the third supply of cooling air is directed from the primary compressor upstream of a compressor discharge plenum of the primary compressor.

10. The system of claim 1, wherein the valve is further configured to selectively direct both a portion of the first supply of cooling air and a portion of the second supply of cooling air to the turbine at the same time.

11. The system of claim 1, wherein the first supply of cooling air is heated in the recuperator using exhaust from the fueled engine.

12. A system for providing compressed air to cool gas turbine engine components comprising:
 a primary compressor, a combustion system, and a turbine fluidly connected to each other;
 an auxiliary air compression system for generating a first supply of cooling air and comprising a fueled engine, an intercooled compressor, and a recuperator;
 an electric backup compression system for generating a second supply of cooling air, the electric backup compression system coupled to an upstream stage of the primary compressor and comprising an electrically-powered motor coupled to a backup compressor; and
 a pathway coupled to an output of each of the auxiliary air compression system and the electric backup compression system; the pathway having a valve configured to selectively direct each of the first supply of cooling air and the second supply of cooling air to the turbine;
 wherein:
 the valve is downstream the recuperator; and
 each of the first supply of cooling air and the second supply of cooling air bypasses the combustion system.

13. The system of claim 12, wherein the electric backup compression system is coupled to an exit of the primary compressor.

* * * * *